March 4, 1952 C. F. TACY 2,587,788
ROTATABLE CHRISTMAS TREE STAND
Filed July 1, 1949 3 Sheets-Sheet 1

Claris F. Tacy
Inventor

By Ralph Nauath
Attorney

March 4, 1952     C. F. TACY     2,587,788
ROTATABLE CHRISTMAS TREE STAND

Filed July 1, 1949     3 Sheets-Sheet 2

Claris F. Tacy
Inventor

By Ralph Danath
Attorney

March 4, 1952 C. F. TACY 2,587,788
ROTATABLE CHRISTMAS TREE STAND
Filed July 1, 1949 3 Sheets-Sheet 3

Claris F. Tacy
Inventor

By Ralph Donath
Attorney

Patented Mar. 4, 1952

2,587,788

UNITED STATES PATENT OFFICE 2,587,788

ROTATABLE CHRISTMAS TREE STAND

Claris F. Tacy, Oakdale, Pa.

Application July 1, 1949, Serial No. 102,614

2 Claims. (Cl. 248—45)

This invention relates to display stands or supports and more particularly to rotating stands for Christmas trees or the like.

One of the objects of this invention is to provide a Christmas tree stand having power means whereby the trees may be rotated while in the erect position.

Another object of this invention is to provide means whereby the power means may operate a musical instrument while the tree is rotated.

A further object of this invention is to provide means whereby each circuit of a plurality of circuits of electric lights on the Christmas tree may be successively lighted.

Another object of this invention is to provide a stand from which the Christmas tree supporting member may be removed to provide a useful rotatable display stand.

Still another object of the present invention is to provide a stand for Christmas trees in which the Christmas tree supporting member is frictionally resting on a plate which freely rests on balls or anti-friction bearings thereby completely releasing the driving mechanism including the musical instrument from the Christmas tree supporting member should any accidental obstruction prevent the Christmas tree supporting member from rotating while the motor is running.

Further objects and advantages of this invention will appear from the following description considered with the accompanying drawings in which Figure 1 is a perspective view showing the Christmas tree stand of this invention.

Figures 1, 3:
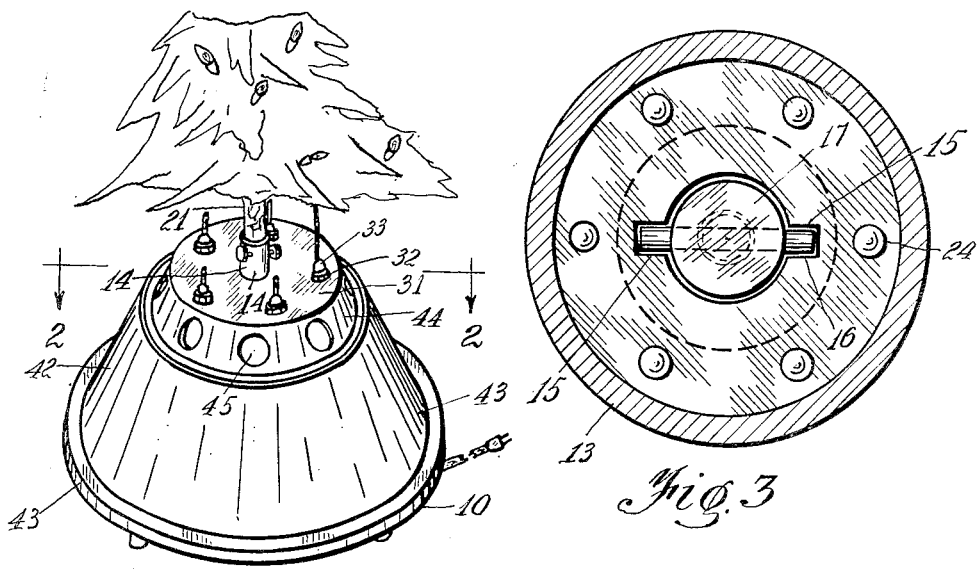
Figure 3 is a partial section on the line 3—3 of Figure 2.
Figure 5:
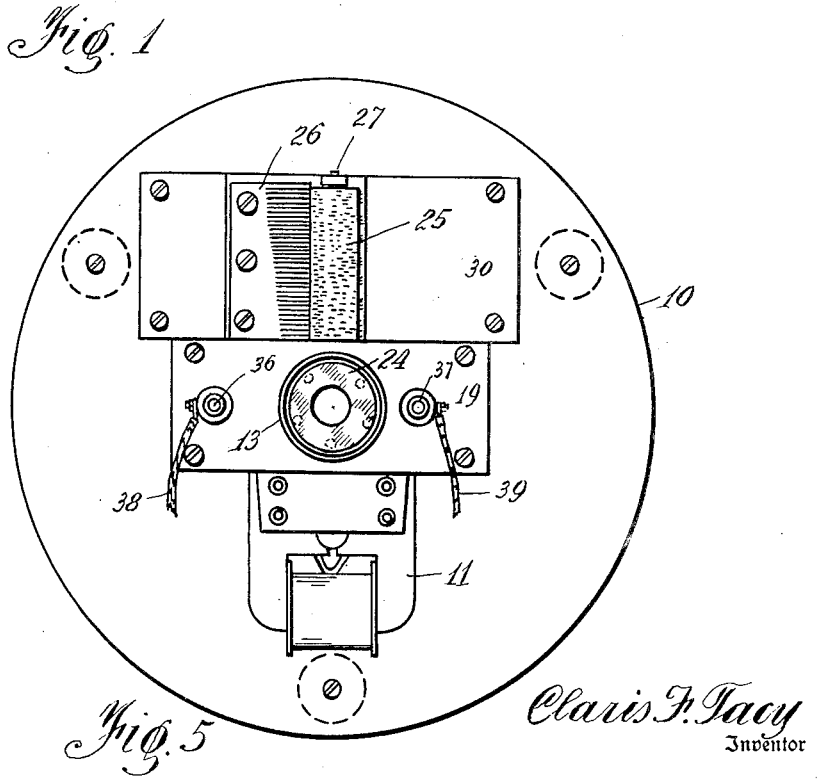
Figure 5 is a partial section on the line 5—5 of Figure 2.

Referring to the drawings, I have illustrated a rotating Christmas tree stand comprising a base 10 having a power element 11, which is preferably an electric motor, mounted thereon and connected to a vertically extending drive shaft 12.

A socket 13 for slidably receiving the tree supporting member 14 is removably connected to the vertically extending main drive shaft 12 by slots 15 slidably engaging a pin 16 through the head 17 of the shaft 12. The socket 13 is mounted on antifriction bearings 18 on a plate 19 supported above the power element 11 by a bracket 20. The tree supporting member 14, in the form of an open ended cylinder, is adapted to surround the end of a tree trunk 21 and hold it in position by holding means such as thumb screws 22. A circular plate 23 rests on ball bearings 24 in the socket 13 and frictionally supports the tree supporting member 14.

A pin studded drum 25 of a musical instrument, the pins of which drum are adapted to engage the teeth of a musical comb 26, is secured on a shaft 27 driven from the main drive shaft 12 by a pair of miter gears 28. The shaft 27 is journaled in a bracket 29 which is mounted on a supporting member 30, upon which is also mounted the musical comb 26.

A revolving contact disc 31 of insulating material, carrying a series of female electrical receptacles 32 on its upper surface, is centralized about the socket 13 and is frictionally secured to supporting member 14, the bottom of which is in frictional contact with circular plate or washer 23 and is adapted to be rotated thereby.

Each of the female electrical receptacles is adapted to receive a male electrical plug 33 of one circuit of lights. A series of contact segments 34 corresponding in number to the number of female electrical receptacles 32 is embedded in the under surface of the contact disc 31 and each segment is connected to one of two contact elements in the corresponding receptacle. A circular collector ring 35 is also mounted in the under side of the contact disc 31 and connected to the other contact element of each receptacle. A spring loaded contact brush 36 mounted in the plate 19 is adapted to contact successively the contact segments 34 as the contact disc 31 revolves. A second spring loaded contact brush 37 mounted in the plate 19 is adapted to continuously contact the collector ring 35 as the contact disc 31 revolves. Each of these contact brushes 36 and 37 are connected to opposite sides 38 and 39 of an external source of electricity in parallel with leads 40 and 41 leading to the power element 11 when the said power element is an electric motor. As the contact disc 31 is revolved by the motor 11 through the socket 13, the contact brush 36 successively makes contact with each of the contact segments 34 thereby successively completing the circuit through each of the female receptacles 32, the collector ring 35 and the contact brush 37.

This causes the different circuits of lights on the Christmas tree which are connected to the different receptacles 32 to be successively energized and lighted. Each of the circuits is preferably equipped with a different color of light bulbs so that the tree is successively lighted with a different color as it rotates.

It is of course obvious that, by the introduction of proper and well-known switches in the contact brush circuit and the motor circuit, either the lights or the driving motor may be independently operated.

Figure 2:
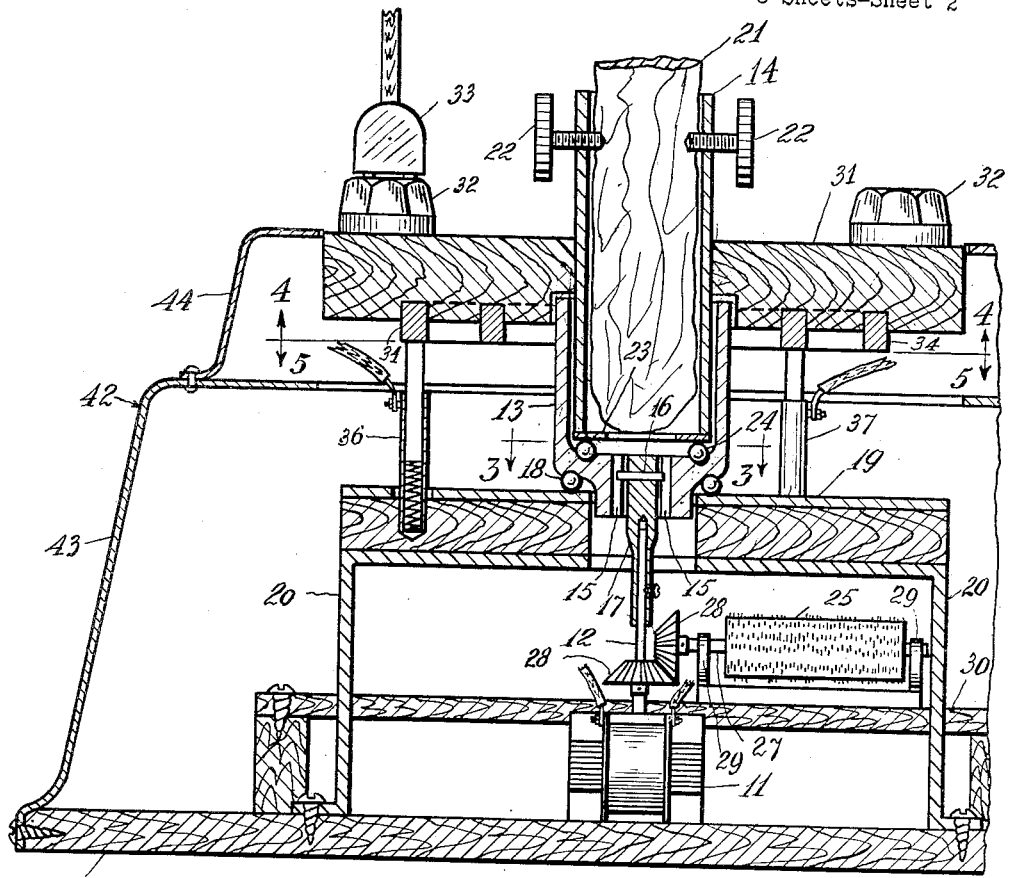
Figure 2 is a vertical section on the line 2—2 of Figure 1.
Figure 4:
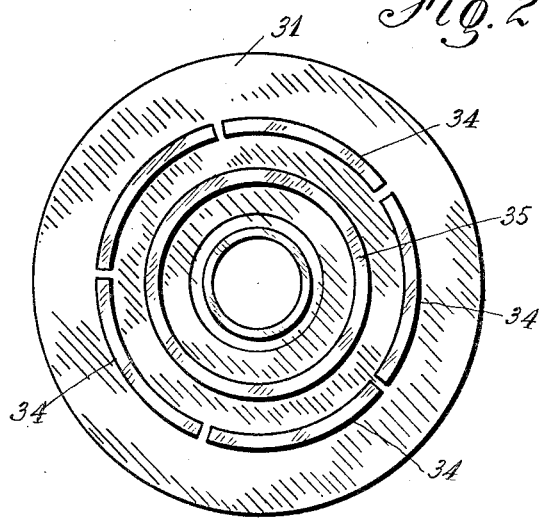
Figure 4 is a partial section on the line 4—4 of Figure 2.
Figure 6:
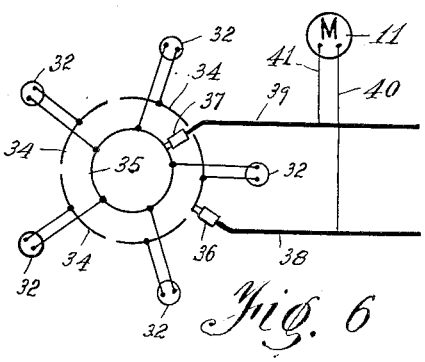
Figure 6 is a diagrammatical showing of the electrical circuit of my invention.
Figure 7:
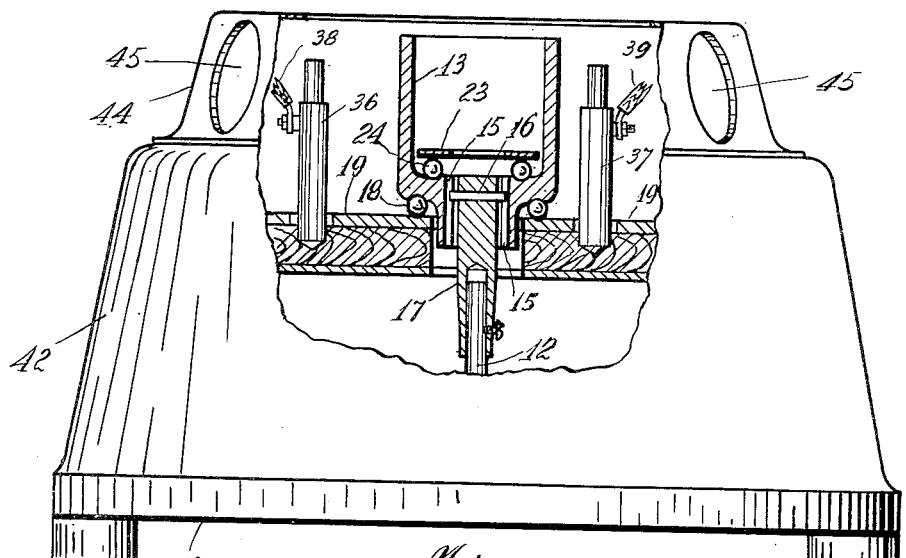
Figure 7 is a side elevation of the stand of my invention partially cut away to show the tree supporting member removed.
Figure 8:
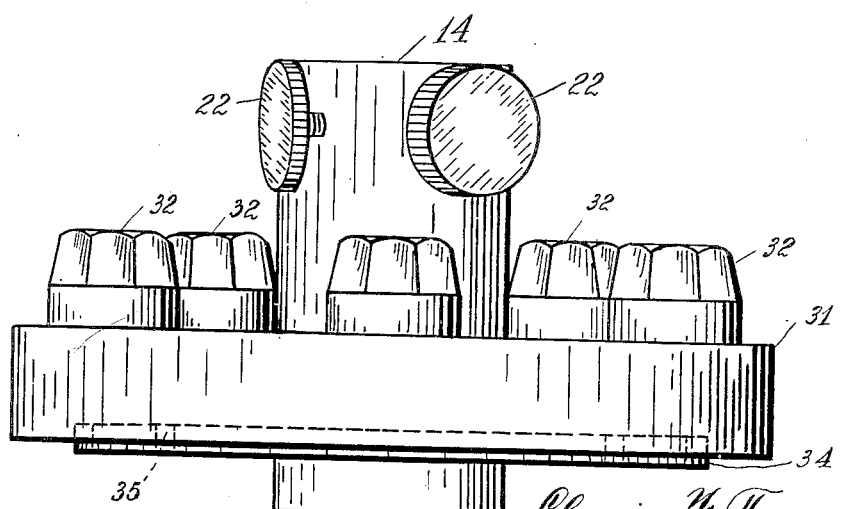
Figure 8 is a side elevation of the removable tree supporting member and contact disc.

Referring now to Figure 2 of the drawings it will be observed that the revolving contact disc 31 and the Christmas tree supporting member 14, both of which represent a unit, may be automatically stopped from rotating should accidental overload prevent the tree from rotating. In that case the lowermost edge of the tree supporting member, which frictionally engages the top of the circular plate or washer 23 that rests on the balls 24, as shown, will slip without stopping the motor including the socket or blowing a fuse. This feature makes the device fool-proof and safe.

A cover 42 in two parts 43 and 44 is mounted on the base 10 so as to enclose the operating structure completely with the exception of the upper surface of the contact disc 31. The upper part 44 of the cover 42 is perforated with openings 45 to permit the musical sounds to escape freely from the structure.

It is believed that from the above description the operation of the various parts of the rotating stand will be apparent without further comment.

While I have illustrated and described a present preferred embodiment of my invention, it will be understood that it may be otherwise embodied within the scope of the following claims:

I claim:

1. In a rotatable Christmas tree stand or the like having a power driven rotating element and a rotatable pin drum driven thereby in contact with a musical comb, the improvement comprising a socket removably keyed to said power driven rotating element, a tree supporting element adapted to fit in said socket and rest upon a circular plate in frictional engagement therewith, bearing members between said circular plate and the socket whereby the tree supporting element and plate are carried along with the socket in rotation but may be halted without halting the socket.

2. In a rotatable Christmas tree stand or the like having a power driven rotating element, the improvement comprising a socket removably keyed to said power driven rotating element, a hollow tree supporting element having an external diameter smaller than the internal diameter of the socket whereby said tree supporting element is freely movable in the socket, a circular plate member upon which said tree supporting element rests in frictional engagement therewith, said circular plate member being freely rotatable in the socket and in frictional engagement therewith through at least one rotatable bearing member whereby the tree supporting element and the circular plate member are carried along with the socket in rotation but may be halted without halting the socket

CLARIS F. TACY.

REFERENCES CITED

The following references are of record in the file of this patent:

UNITED STATES PATENTS

| Number | Name | Date |
| --- | --- | --- |
| 199,044 | Echardt | Jan. 8, 1878 |
| 704,513 | Campbell | July 15, 1902 |
| 1,174,383 | Brach | Mar. 7, 1916 |
| 1,971,300 | Garrett | Aug. 21, 1934 |
| 1,987,994 | Doring | Jan. 15, 1935 |
| 1,988,343 | Tacy | Jan. 15, 1935 |
| 2,005,293 | Harris et al. | June 18, 1935 |
| 2,075,918 | Waalkes | Apr. 6, 1937 |
| 2,345,147 | Petrocca | Mar. 28, 1944 |
| 2,422,149 | Unkles et al. | June 10, 1947 |
| 2,469,884 | Masone | May 10, 1949 |